United States Patent [19]
Carstensen

[11] Patent Number: 5,971,721
[45] Date of Patent: Oct. 26, 1999

[54] HIGH PRESSURE PUMP HAVING AN ECCENTRIC TRANSMISSION

[75] Inventor: Peter T. Carstensen, Adirondack, N.Y.

[73] Assignee: Thermo Fibertek Inc., Waltham, Mass.

[21] Appl. No.: 09/049,516

[22] Filed: Mar. 27, 1998

[51] Int. Cl.$^6$ ................................................. F04B 35/04
[52] U.S. Cl. ........................... 417/362; 417/415; 74/36; 74/37; 474/141
[58] Field of Search ................................. 417/415, 362; 74/36, 37; 474/84, 88, 141

[56] References Cited

U.S. PATENT DOCUMENTS

| | | |
|---|---|---|
| 513,589 | 1/1894 | Metz . |
| 1,906,801 | 5/1933 | Mather . |
| 2,648,986 | 8/1953 | Guyer . |
| 2,811,034 | 10/1957 | Hinton ................................... 417/362 |
| 2,994,216 | 8/1961 | Morton . |
| 3,064,487 | 11/1962 | Warrick et al. . |
| 3,187,674 | 6/1965 | Hammelmann .......................... 417/415 |
| 3,190,149 | 6/1965 | Gorfin . |
| 4,936,812 | 6/1990 | Redmond . |
| 5,427,581 | 6/1995 | McGrath et al. . |
| 5,540,627 | 7/1996 | Miyata . |
| 5,802,648 | 9/1998 | Neun et al. . |
| 5,829,958 | 11/1998 | Von Hollen ............................. 417/362 |

*Primary Examiner*—Charles G. Freay
*Attorney, Agent, or Firm*—Kane, Dalsimer, Sullivan, Kurucz, Levy, Eisele and Richard, LLP

[57] ABSTRACT

An energy efficient high pressure pump system includes a drive motor driving an eccentric transmission, which drives a reciprocation pump having a number of cylinders. The eccentric transmission transmits a torque demand from the reciprocating pump, which varies with time, to the drive motor such that the torque demand on the drive motor is substantially constant. The pump system includes an eccentric sprocket mounted on the output shaft of a drive motor and driving an eccentric sprocket on an idler which includes a concentric sprocket driving a concentric sprocket on the reciprocating pump with the eccentricity of the eccentric sprockets being proportional to the maximum and minimum torque demand characteristics of the reciprocating pump.

12 Claims, 3 Drawing Sheets

HIGH PRESSURE PUMP HAVING AN ECCENTRIC TRANSMISSION

BACKGROUND OF THE INVENTION

1. Field of the Invention

The present invention relates to an energy efficient high pressure pump system applicable to paper manufacture and other uses.

2. Description of the Related Art

High pressure fluid is useful in many industrial applications. For example, in the paper industry, water and other fluids are used to shower, clean and otherwise treat paper-making fabrics used to form and dry a continuous paper sheet. These fabrics accumulate contaminants from the process, which must be removed, in addition to other deterioration in properties, which result from the applications and environment in which they are used. For example, a press fabric may be required to pass through one or more high pressure nips which apply great compressive pressure. The nip pressure causes the fabric to compress and close, affecting such operational characteristics as permeability of the fabric to water flow. These characteristics are critical to fabric operation.

There are essentially two basic methods to apply fluid to fabrics to affect operational characteristics. Low pressure, relatively high volume fluid can be applied to essentially flush contaminants away and flood or almost flood void volumes of fabrics. Higher pressure, lower volume flow can be applied, usually in concentrated streams, to apply power to the fabric and thus remove contaminants and mechanically affect other characteristics. In this regard see for example U.S. Ser. No. 08/498,909 entitled "Apparatus and Method of Fabric Cleaning", filing date Jul. 6, 1995 which has been allowed and which is commonly assigned and whose disclosure is incorporated herein by reference.

Conventional pressures in papermaking seldom exceed 2,500 psi since the generation of high pressures (up to 5,000 psi) in incompressible fluids is expensive and requires apparatus of inherent limitations. The pumping of incompressible fluid may be accomplished in a large number of ways. Most conventional and efficient is a rotating vane pump. Such a pump generally depends on a rotary impeller imparting energy to a fluid via centrifugal force. These pumps are common, and exist in a myriad of forms. In conventional applications, they are typically limited, however, to pressures of much less than 1,000 psi. As applications vary there is usually slippage within the pump body, which generates heat. If the application flow is allowed to fall below a specific threshold, cavitation or media vaporization occurs. The conventional method employed to prevent the aforementioned situation from occurring is to insure sufficient flow through the pump cavity. This is accomplished with use of waste gates or combination recirculation and cooling loops.

In the case where higher pressures are desired, there are fewer alternatives. This usually involves a positive displacement apparatus. A positive displacement pump is most commonly a variation of a reciprocating piston and cylinder, the flow which is controlled by some sort of valving. Reciprocal machinery is however less attractive than rotary machinery because it is inherently more complicated and less reliable than the rotary type. More importantly the output of a reciprocal machine is cyclic. The cylinder alternately pumps or fills. Therefore, there are breaks in its output. This disadvantage can be overcome to a certain extent by using multiple cylinders, and by passing the pump output through flow accumulators, attenuators, dampers or, as commonly done, waste gate the excess pressure thereby removing the high pressure output portion of the flow.

In addition to uneven pressure and flow output, reciprocating pumps have another disadvantage. They have uneven power input proportional to their output. This causes excessive wear and tear on the apparatus, and is inefficient because the pump drive must be sized for the high torque required when the position of the pump connecting rod is at an angular displacement versus crankarm dimension during the compression stroke that would result in the highest required input shaft torque.

Moreover, if the demand of the application varies, complicated bypass, recirculation or waste gate systems must be used to keep the pump from "dead-heading." That is, if flow output is blocked when the pump is in operation, the pump will either break down by the increased pressure developed or stall. If stalling occurs, a conventional induction electric motor will burn out as it assimilates a locked rotor condition with full rated voltage and amperage applied. Typical hydraulic systems with fixed displacement pumps use a relief valve to control the maximum system pressure when under load. When the flow required by the application is less than that delivered by the pumping system, the excess flow is vented by use of a relief valve.

Therefore, the pump delivers full flow at full pressure regardless of the application. This is a prime example of how a large amount of power is wasted.

In this regard, certain prior art that attempts to address such problems in differing environments should be noted. U.S. Pat. No. 513,589 to Metz describes a gear-train for a bicycle wherein the driven wheel includes a circular sprocket driven through a chain by an elliptical sprocket of the crankshaft.

U.S. Pat. No. 1,906,801 to Mather describes a dyeing machine, which includes an intergearing of an elliptical winch and a circular winch by a chain drive to ensure uniform surface speeds of the winches.

U.S. Pat. No. 2,648,986 to Guyer describes a pump drive employing an eccentric hub for adjusting the position of the drive belt toward and away from the drive wheel. This adjustment provides for varying the speed of the pump by changing the level of the belt on the surface of the drive wheel. This adjustment also provides for using different sizes of belts.

U.S. Pat. No. 2,994,216 to Morton describes a laundry apparatus, which employs an elliptical sheave mounted eccentrically to the shaft of a basket and which rotates about the shaft at all times with the basket.

U.S. Pat. No. 3,064,487 to Warwick et al. describes an eccentrically adjustable pulley adapter on a motor base shaft to eccentrically shift a transfer pulley stud so that a desired tension in the belt can be obtained.

U.S. Pat. No. 3,190,149 to Gorfin describes a speed reduction drive mechanism for converting power at high speed and relatively low torque to low speed and relatively higher torque. An eccentric disk is rotated about a shaft axis, to drive a gear, which undergoes a combined oscillating and reciprocating motion. The gear then transmits power to a cylindrical drive element and hence to a pulley, which drives a drive belt.

U.S. Pat. No. 4,936,812 to Redmond describes a torque reactive tension mechanism wherein an eccentric gear set is used as a means for automatically adjusting for fluctuations in the center distance of a power transmission drive system.

U.S. Pat. No. 5,427,581 to McGrath et al. describes an independently steerable idler pulley wherein a non-concentric inner sleeve bushing is mounted within a pulley. As the bushing rotates about its axis, the skew angle is translated to the pulley, thereby maintaining a belt in its properly mounted position on the pulley during operation.

U.S. Pat. No. 5,540,627 to Miyata describes an auto-tensioner for applying tension to a transmission belt by a tension pulley and for damping reaction forces acting from the belt.

SUMMARY OF THE INVENTION

It is an object of the present invention to produce a high pressure pump system, which includes a reciprocating pump having at least one cylinder for pumping a fluid, wherein torque demand at the shaft of a driving motor is an approximately continuous level throughout the pumping cycle.

This and other beneficial objects are obtained in accordance with the present invention by providing an eccentric power transmission between a torque drive motor and the reciprocating pump. The eccentric power transmission causes the pump shaft to reduce velocity and increase torque during each compression stroke of each cylinder and to increase velocity and decrease torque during each charging cycle of each cylinder. The eccentricity of the eccentric power transmission is related to the difference between the maximum and minimum torque levels throughout the cycle. The eccentric power transmission may be used in conjunction with a reciprocating pump having any number of cylinders.

BRIEF DESCRIPTION OF THE DRAWINGS

Thus by the present invention, its objects and advantages will be realized, the description of which should be taken with regard to the accompanying drawings herein.

DETAILED DESCRIPTION OF THE PREFERRED EMBODIMENTS

Figure 1:
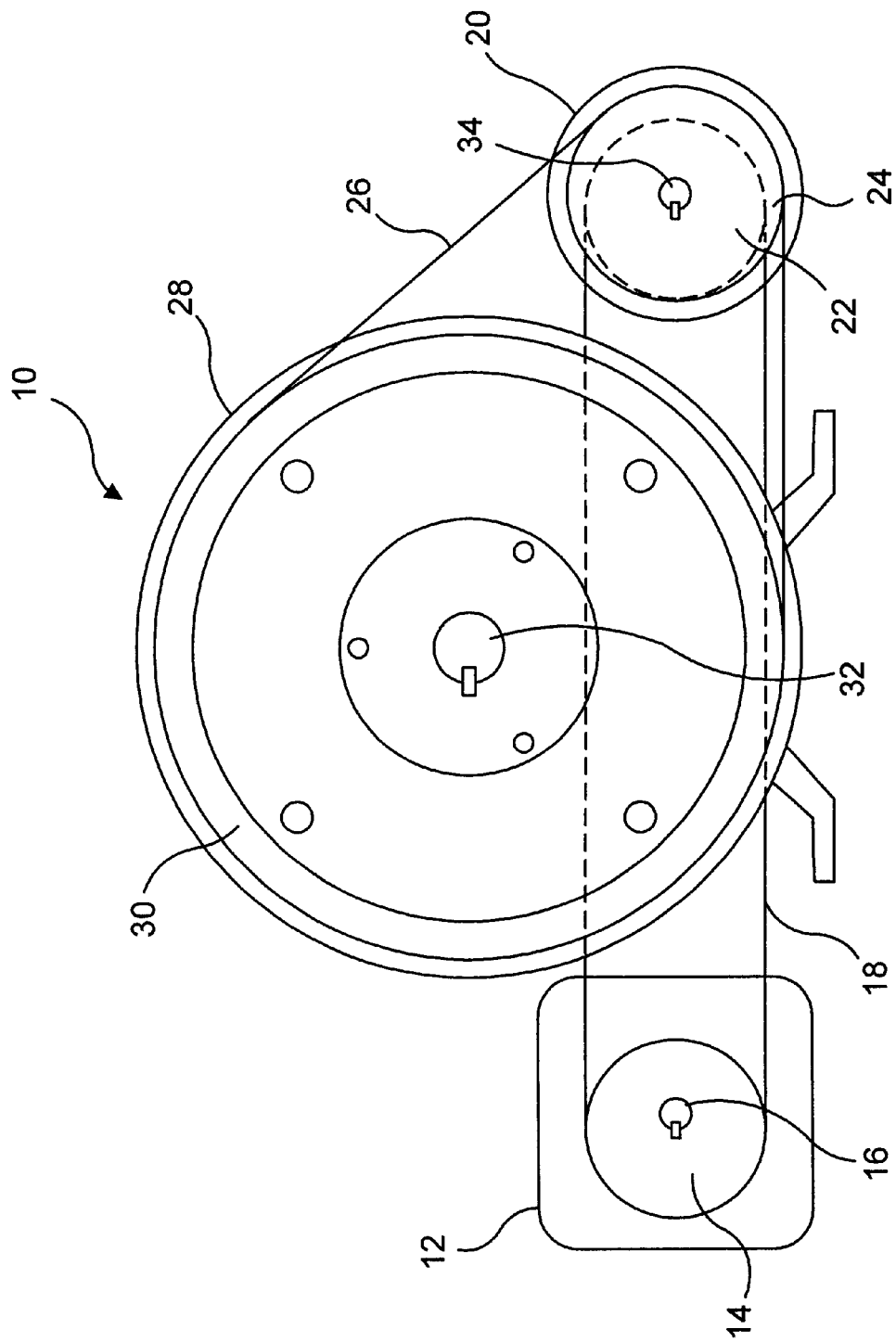
FIG. 1 is a front elevational view of a high-pressure pump system according to the present invention.

Those skilled in the art will gain appreciation of the present invention when viewed with the accompanying drawings of FIGS. 1–5, inclusive. The individual reference characters designate the same or similar elements throughout the several drawings.

Referring now to FIG. 1, there is seen an embodiment high-pressure pump system 10 of the present invention. The high pressure pump system 10 includes a torque drive motor 12, which may be, for example, a direct-current, flux vector or servo motor. Drive motor 12 serves as a source of torque, power and rotational motion for driving the remaining components of the high pressure pump system 10, described more fully below. The drive motor 12 includes an output shaft 16 on which a sprocket 14 is non-rotatably mounted. Sprocket 14 may be held non-rotatable with respect to output shaft 16 by, for example, a key, a pin, splines, grip springs or by a friction fit. Sprocket 14 is positioned eccentrically with respect to output shaft 16. Drive motor 12 drives a drive belt 18, which may be, for example, a cogged belt, a ribbed belt or any other belt suitable for purpose. Preferably, the belt will be of a nature where no slip is possible. It will be appreciated that although drive belt 18 is referred to and described as a belt, drive belt 18 may be in the form of a chain drive.

Drive belt 18 drives eccentric sprocket 24 of idler 20. Eccentric sprocket 24 is rotatable about the central axis of a shaft 34. Eccentric sprocket 24 may be mounted non-rotatably on shaft 34 by, for example, use of a key, a pin, splines, grip springs or by a friction fit. Alternatively, eccentric sprocket 24 may be rotatable with respect to a non-rotating shaft 34 by, for example, journal bearings, fluid-film bearings or rolling element bearings. It will be appreciated that the type of bearing used, if any, will be dictated by such design considerations such as expected power, torque and speed of the drive elements. It will be further appreciated that the design of belt 18 will dictate the designs of sprocket 14 and eccentric sprocket 24, and vice versa. Sprocket 14 and eccentric sprocket 24 are each generally circular. It will be appreciated that because of the eccentric positioning of sprocket 14 and eccentric sprocket 24 with respect to the respective shafts 16, 34, sprocket 14 and eccentric sprocket 24 may take other geometrical forms. It will be further appreciated that the geometric forms of sprocket 14 and eccentric sprocket 24 should be such so as to impart a constant tension on drive belt 18.

Also mounted rotatable on shaft 34 is idler sprocket 22, which is non-rotatable with respect to eccentric sprocket 24. Idler sprocket 22 will be either rotatable or non-rotatable with respect to shaft 34 in accordance with whether eccentric sprocket 24 is rotatable or non-rotatable with respect to shaft 34. That is, idler sprocket 22 will be rotatable with respect to shaft 34 when eccentric sprocket 24 is rotatable with respect thereto and vice versa. Eccentric sprocket 24, shaft 34 and idler sprocket 22 are the major components of idler 20. Idler 20 may include additional components, such as mounting hardware, positioning components and belt tensioning components.

The center of eccentric sprocket 24 has a generally circular shape having its center spaced apart from the center of idler sprocket 22. Because the center of idler sprocket 22 coincides with the center of shaft 34, the center of eccentric sprocket 24 is also spaced apart from the center of shaft 34. Accordingly, the position of eccentric sprocket 24 is eccentric with respect to idler sprocket 22 and shaft 34. Idler sprocket 22 and eccentric sprocket 24 may be integral or discreet components.

Idler sprocket 22 drives a drive belt 26, which may be in the form of a flat belt, a v-belt, a cogged belt, a ribbed belt, a timing belt or a drive chain, or any other form suitable for purpose. A method of timing the pulleys by slipping them on their shafts must be incorporated to keep the shafts in phase. Drive belt 26 then drives pump drive sprocket 30, which, through shaft 32, drives reciprocating pump 28. Pump drive sprocket 30 is mounted non-rotatably with respect to shaft 32 by, for example, the use of a key, a pin, splines, grip springs or by friction fit. Pump drive sprocket 30 is generally circular. The design of pump drive sprocket 30 and idler sprocket 22 will be dictated by the design of drive belt 26 and idler sprocket 22 and vice-versa.

Figure 2:
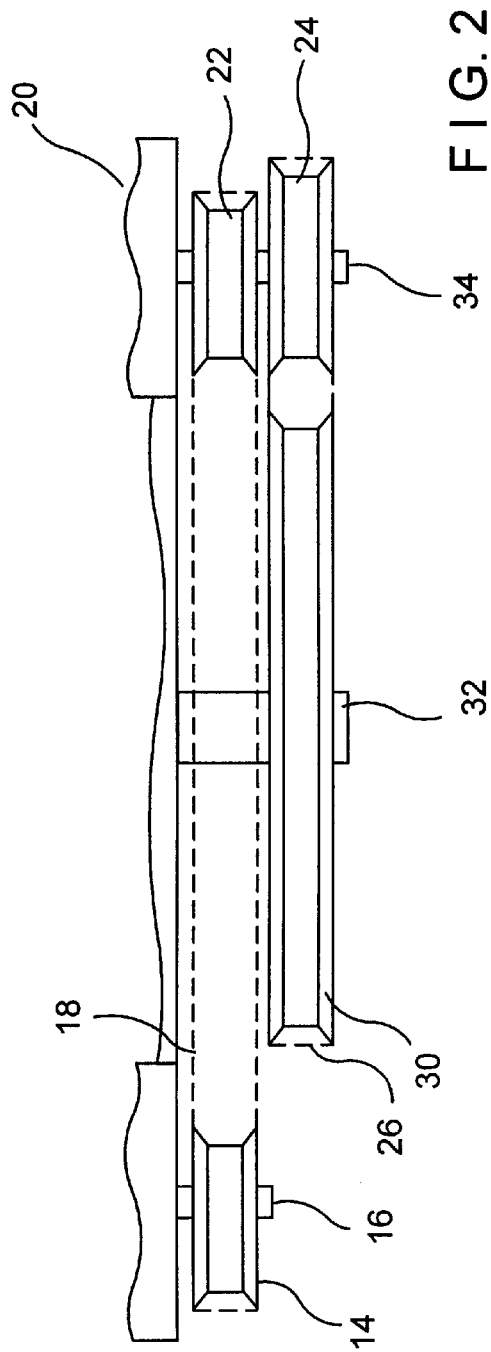
FIG. 2 is a top plan view of the high-pressure pump system illustrated in FIG. 1.

Now referring to FIG. 2, there is seen a top plan view of the high pressure pump system illustrated in FIG. 1. In FIG.

2 illustrates the major drive components of high pressure pump system 10 with drive belt 18 and drive belt 26 shown in phantom.

The following describes an embodiment of the present invention wherein the reciprocating pump includes three cylinders. Note that the present invention may be used in connection with a reciprocating pump 28 having any number of cylinders.

In the illustrative embodiment, the reciprocating pump 28 has three cylinders. Each cylinder undergoes a charging stroke, wherein fluid is drawn into the cylinder from a fluid source, and a compression stroke, wherein the fluid is expelled from the cylinder under pressure. The charging stroke and the compression stroke define one cycle of the cylinder. Each cylinder undergoes one complete cycle during each revolution of the pump drive sprocket 30.

During the charging stroke, the reciprocating pump 28 has a decreasing torque demand, whereas during the compression stroke, the reciprocating pump 28 has an increasing torque demand. The reciprocating pump 28 will, generally, reach its maximum torque demand when the piston is 90° from its top-dead-center (TDC) position and will reach its minimum torque demand when the piston reaches its top or bottom-dead-center (BDC) position.

Figure 3:
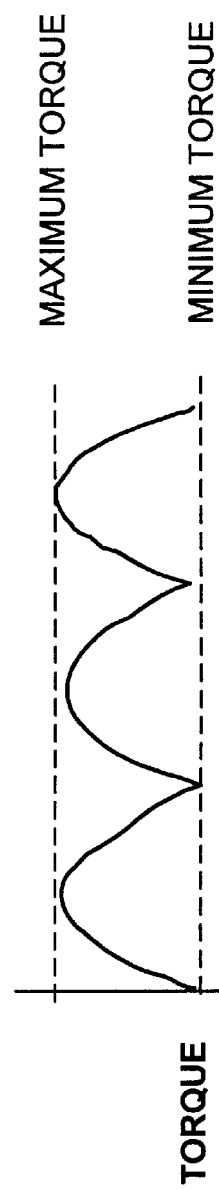
FIG. 3 is a graphical representation showing the relationship between torque and angular position of a shaft of three-cylinder reciprocating pump.

Referring now to FIG. 3, the torque demand of the reciprocating pump 28 is represented with respect to the angular position of the shaft 32, and therefore, the pump drive sprocket 30. The graph shown in FIG. 3 represents one complete revolution of the shaft 32, and, therefore, the pump drive sprocket 30. It can readily be seen from FIG. 3 that the reciprocating pump 28 has three demand cycles during each revolution of the shaft 32. The three peak torque demand values shown in FIG. 3 correspond to the cylinders reaching their respective TDC positions. The torque demand of a reciprocating pump having a number of cylinders, N, will show an equal number of N peaks in a graph illustrating torque demand versus shaft position. FIG. 3 also illustrates that the maximum and minimum torque demands are generally equal for each cylinder.

In a conventional drive system, wherein eccentric sprockets 14, 24 are not employed, the torque demand characteristics of the reciprocating pump 28 would be transmitted from the reciprocating pump 28 to the drive motor 12. However, the eccentricity of sprocket 14 and eccentric sprocket 24 transmits varying torque to the pump drive sprocket 30 from a constant torque output at the shaft 16 of the drive motor 12. In other words, eccentric sprocket 24 and sprocket 14, because of the eccentricity thereof, even out the torque demand at the shaft 16 of the drive motor 12.

It is well known that in conventional torque drive technology, power usage is directly related to the product of torque and velocity. It is also known that as pump flow is reduced, the torque, and thus the pressure, will remain constant as velocity, and thus pump displacement, decreases.

In the illustrative embodiment wherein the reciprocating pump has three cylinders, the idler 20 has a 3:1 ratio with respect to the pump drive sprocket 30. That is, for each revolution of the pump drive sprocket 30, the idler sprocket 22 and eccentric sprocket 24 revolve three times. By adjusting the maximum torque output of the eccentric sprocket 24 to coincide with the minimum torque demand of the reciprocating pump 28, and vice versa, a generally constant torque demands on the drive motor 12 throughout the entire cycle can be achieved. That is, the angular speed at the pump drive sprocket 30 and shaft 32 is reduced during each compression stroke, which corresponds to the high torque regions of the curve illustrated in FIG. 3, by the low torque output of the eccentric sprocket 24. Similarly, the angular speed at the pump drive sprocket 30 and shaft 32 is increased during each charging stroke, which correspond to the low torque regions of the curve illustrated in FIG. 3, by the high torque output of the eccentric sprocket 24. The eccentricity of the eccentric sprocket 24 with respect to the idler sprocket 22 should be equal to the eccentricity of the sprocket 14 with respect to shaft 16 so that constant tension may be maintained on drive belt 18. This eccentricity is proportional to the difference between the maximum and minimum torque demands of the reciprocating pump 28. The maximum and minimum torque demands of the reciprocating pump 28 may be determined based on such factors as output flow rate and pressure and on the material properties of the pumped fluid. While the foregoing illustrative embodiment employs a reciprocating pump 28 having three cylinders, it will be appreciated that the present invention may be used in conjunction with a reciprocating pump 28 having any number of cylinders. It will be further appreciated that the ratio between the pitch diameter of the pump drive sprocket 30 and the pitch diameter of the idler sprocket 22 is directly related to the number of cylinders. For example, for a reciprocating pump 28 having five cylinders, a 5:1 ratio should be used so that each revolution of the idler sprocket 22 would correspond to one of the five torque demand cycles that occur during each revolution of the pump drive sprocket 30 and shaft 32, or each complete cycle of reciprocating pump 28.

Figure 4:
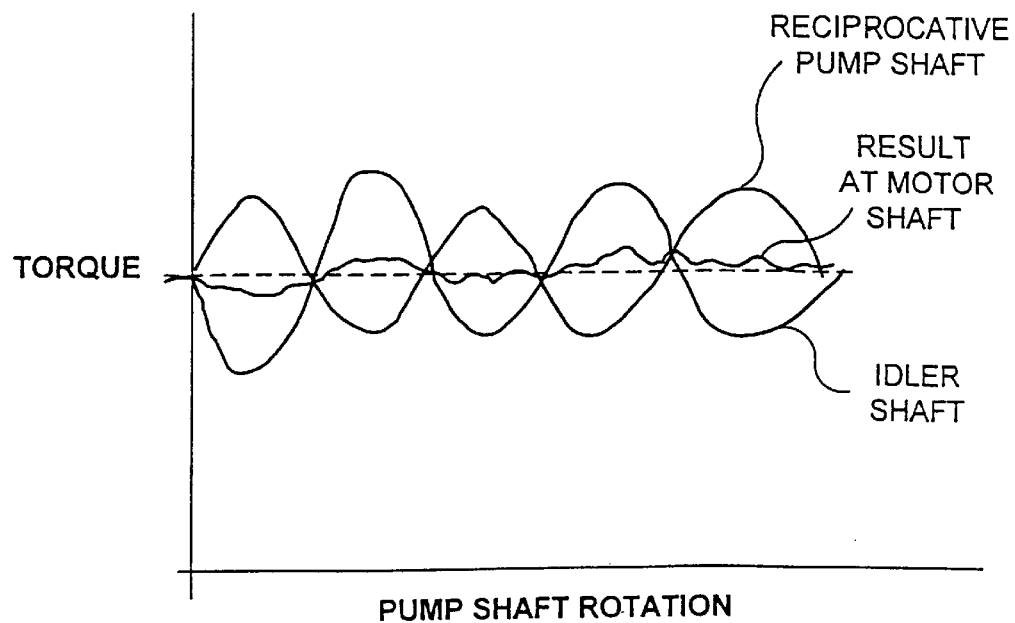
FIG. 4 is a graphical representation showing the torque output at the shaft of a drive motor of the high-pressure pump system illustrated in FIG. 1.

Referring now to FIG. 4, there is seen the torque values at the reciprocating pump 28, the idler 20 and the resultant torque at the shaft 16 of drive motor 20 as a function of the angular position of the shaft 32. The graph shown in FIG. 4 represents these torque values for the illustrative embodiment, wherein the reciprocating pump includes three cylinders. In FIG. 4, it is clearly seen that the torque demand curve of the idler 20 is out of phase with that of the reciprocating pump to effectively absorb, dampen or even out the torque demand transmitted to the drive motor 12. Accordingly, the torque demand placed on the drive motor is substantially constant throughout the cycle of the reciprocating pump 28. If sprocket 14 and eccentric sprocket 24 were not eccentric with respect to the respective shafts 16, 34, the torque demand characteristics of the reciprocating pump 28 would be directly transmitted to the drive motor 12.

Figure 5:
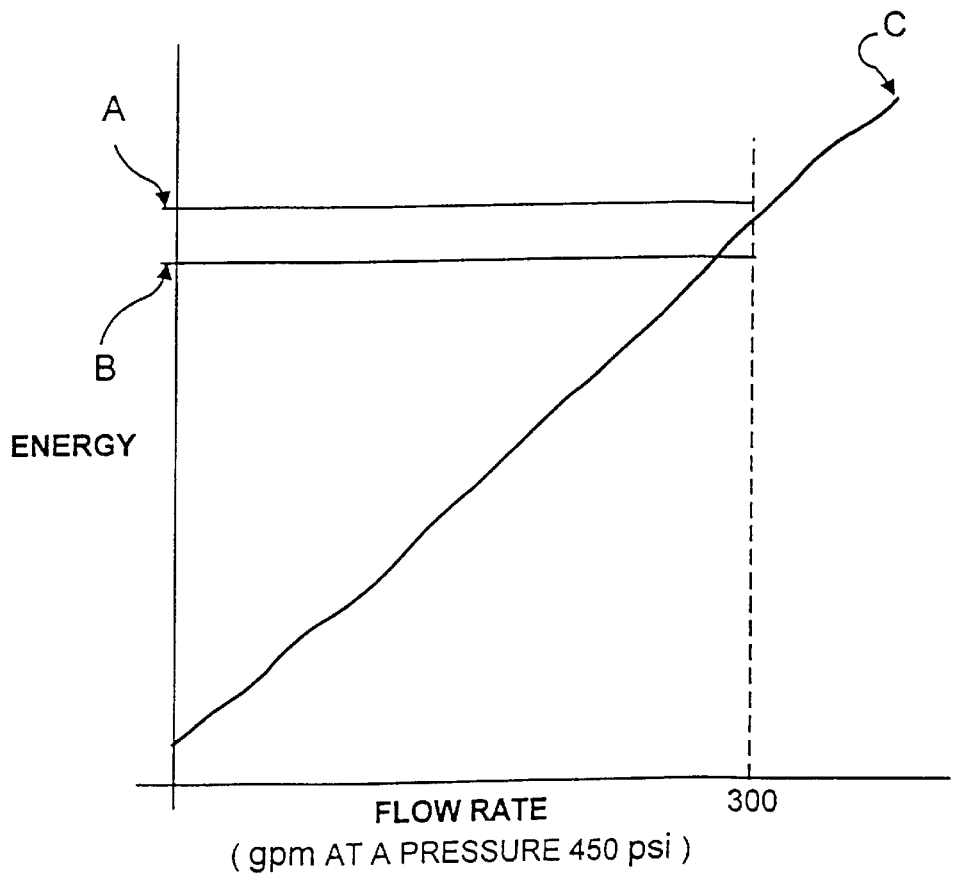
FIG. 5 is a graphical representation showing the energy efficiency of the high-pressure pump system illustrated in FIG. 1.

Referring now to FIG. 5, there is seen the relationship between energy usage of the present invention and pump systems of the prior art as a function of fluid flow rate in gallons-per-minute (gpm) at a pressure of 450 psi. Curve A represents the energy usage of a conventional system employing a waste gate pressure reduction system, a soft-start 3-hp induction 100-hp motor and a torque limiting transmission. It can be seen that the energy consumption of this first system is substantially constant regardless of flow rate. It will be appreciated that the maximum flow rate at 450 psi is approximately 300 gpm. Curve B represents the energy usage of another conventional pump system. This second system includes a soft-start 3 hp induction motor. It can be seen that the energy consumption of this second system is also substantially constant regardless of the output, flow rate. The maximum flow rate of this second system at a pressure of 450 psi is also approximately 300 gpm. Curve C represents the energy usage of an embodiment high pressure pump system 10 wherein the reciprocating pump 28 includes five cylinders and wherein the drive motor 12 is an AC vector or servo torque drive motor. It can be seen that the energy, and therefor the operating cost, is proportional to the flow rate. Energy consumed by this embodiment of the high pressure pump system 10 is lower throughout the usable flow rate range of the conventional systems. Further, this embodiment of the high pressure pump system 10 has a flow rate range, which exceeds that of the described conventional systems.

The advantages of the high pressure pump system 10 include a longer expected pump life due to the reduced cycling of torque demand. Because the shaft 32 of the reciprocating pump 28 is accelerated during the charging stroke, a shorter dwell time is achieved between compression strokes, thereby reducing output pulsations. Finally, the bearing surfaces of the high pressure pump system 10 will experience reduced kinetic shock.

Obviously numerous modifications may be made to the present invention without departing from the scope thereof. For example, the reciprocating pump 28 may be replaced with a positive displacement vacuum pump or positive displacement air compressor. Further, the eccentric input into the reciprocating pump 28 need not take the form of a sprocket 14 and an eccentric sprocket 24 but may be accomplished by, for example, crank arms, cams, offset centerline gear sets or eccentric belt pulleys.

Thus, the aforementioned objects and advantages are most effectively attained. Although preferred embodiments of the present invention have been disclosed and described in detail herein, it should be understood that this invention is in no sense limited thereby and its scope is to be determined by that of the appended claims.

What is claimed is:

1. A pump system, comprising:
    a drive motor;
    a reciprocating pump for pumping a fluid, said reciprocating pump having at least one cylinder, a torque demand of said reciprocating pump varying with time; and
    means for transmitting rotational motion from said drive motor to said reciprocating pump, said transmitting means imparting a substantially constant torque demand to said drive motor from said reciprocating pump.

2. The pump system according to claim 1, wherein said transmitting means transmits rotational motion to said reciprocating pump at a decreasing speed and an increasing torque when each of said at least one cylinder is in a compression stroke and an increasing speed and decreasing torque when each of said at least one cylinder is in a charging stroke.

3. The pump system according to claim 2, wherein said transmitting means transmits rotational motion to said reciprocating pump at a minimum speed and a maximum torque when each of said at least one cylinder is at the end of the compression stroke and at a maximum speed and a minimum torque when each of said at least one cylinder is at the end of the charging stroke.

4. The pump system according to claim 1, wherein said transmitting means comprises:
    a first circular sprocket being driven by said drive motor and driving a first belt, said first circular sprocket being eccentric with respect to an output shaft of said drive motor;
    a second circular sprocket, said second circular sprocket being rotatable about an axis, being positioned eccentrically with respect to said axis and being driven by said first drive belt;
    a third sprocket being rotatable about said axis in accordance with the rotation of the second sprocket about said axis and being positioned concentrically with respect to said axis, said third sprocket driving a fourth sprocket on said reciprocating pump through a second drive belt.

5. The pump system according to claim 4, wherein a ratio of a pitch diameter of said fourth sprocket to a pitch diameter of said third sprocket being directly proportional to the number of cylinders of said reciprocating pump.

6. The pump system according to claim 4, wherein the eccentricity of said second sprocket with respect to said axis and said first sprocket with respect to said output shaft being proportional to a difference between a maximum and a minimum torque demand of said circulating pump.

7. The pump system according to claim 1, wherein said drive motor comprises a direct-current motor.

8. The pump system according to claim 1, wherein said drive motor comprises a flux vector motor.

9. The pump system according to claim 1, wherein said drive motor comprises a servo motor.

10. The pump system according to claim 1, wherein the pump system generates a high pressure in excess of 1000 psi.

11. A transmission device for a high pressure pump system for transmitting rotational motion from an output shaft of a drive motor to a shaft of a reciprocating pump, said reciprocating pump having at least one cylinder and having a torque demand varying with time, said transmission device comprising:
    a first sprocket being positioned eccentrically with respect to said output shaft and being driven thereby, said first sprocket driving a first drive belt;
    a second sprocket rotatable about an axis and being driven by said first drive belt, said second sprocket being positioned eccentrically with respect to said axis;
    a third sprocket rotatable about said axis in accordance with the rotation of said second sprocket about said axis, said third sprocket being positioned concentrically with respect to said axis and driving a second drive belt; and
    a fourth sprocket for driving said shaft of said reciprocating pump, said second belt driving said fourth sprocket.

12. The transmission device according to claim 10, wherein the eccentricity of said first sprocket with respect to said output shaft and said second sprocket with respect to said axis being proportional to a difference between a maximum and a minimum torque demand of said reciprocating pump.

* * * * *